United States Patent [19]

Maguire

[11] Patent Number: 5,269,466
[45] Date of Patent: Dec. 14, 1993

[54] GAS TURBINE ENGINE INCLUDING A VARIABLE AREA NOZZLE

[75] Inventor: Addison C. Maguire, Findern, England

[73] Assignee: Rolls-Royce plc, London, England

[21] Appl. No.: 466,413

[22] Filed: Jan. 28, 1983

[30] Foreign Application Priority Data

Feb. 10, 1982 [GB] United Kingdom ............... 8203827

[51] Int. Cl.$^5$ ............................................. B64C 9/38
[52] U.S. Cl. ............................ 239/265.39; 239/265.41
[58] Field of Search ................... 239/265.39, 265.41, 239/265.33, 265.37; 60/233, 271

[56] References Cited

U.S. PATENT DOCUMENTS

| | | | |
|---|---|---|---|
| 4,049,198 | 9/1977 | Maurer | 239/265.39 |
| 4,141,501 | 2/1979 | Nightingale | 239/265.39 |
| 4,420,932 | 12/1983 | Mendez | 60/230 |
| 4,456,178 | 6/1984 | Jones | 239/265.39 |
| 4,621,769 | 11/1986 | Szuminski | 239/265.39 |

FOREIGN PATENT DOCUMENTS 852670 10/1960 United Kingdom .
865881 4/1961 United Kingdom .

*Primary Examiner*—Donald F. Walsh
*Attorney, Agent, or Firm*—Cushman, Darby & Cushman

[57] ABSTRACT

Known variable nozzle actuating mechanisms are of complicated construction. This is acceptable where the devices are used on engines which power manually controlled aircraft. The invention although usable on engines used as described above, is particularly useful on engines which power pilotless vehicles i.e. missiles by virtue of its simplicity and therefore reliability. The variable nozzle has flaps which are held in a first throat constricting position by a knuckle mechanism. Opening of the throat is achieved by moving ram rods to the left as viewed in the drawings, to straighten the knuckle mechanism about an intermediate pivot. Gas loads on the inner surfaces of the flaps push the flaps outwards. At all operating positions of the flaps except this fully open position, gas loads are transferred via the knuckle mechanisms onto the fixed cowl. Secondary flaps may be included.

8 Claims, 2 Drawing Sheets

GAS TURBINE ENGINE INCLUDING A VARIABLE AREA NOZZLE

The present invention relates to a gas turbine engine, the nozzle area of which can be varied, so as to cater for varying mass flows therethrough.

The invention has particular efficacy in connection with powered missiles, the powerplant of which is of course expendable, but is not restricted to such use.

The general requirement is that a missile, having been launched e.g. from a parent aircraft, should gain cruise altitude and on nearing its target accelerate with the aid of re-heat to avoid destruction before impact. The flight regime thus requires exhaust nozzle configurations which firstly prevent turbine overspeed through ram effect on the compressor, enable cruise speed at altitude and then dash capability. What is required, in view of the nozzle being operated without supervision by a pilot, is that the mechanism which manipulates the nozzle should be as simple as possible, so as to reduce the possibility of malfunction.

The present invention seeks to provide a gas turbine engine including a variable area nozzle with improved actuating means.

According to the present invention a gas turbine engine comprises a variable area nozzle including an array of converging flaps which cooperate to form a throat, a fixed cowl surrounding the array of flaps, knuckle mechanisms each of which has one end pivotally connected to the fixed cowl and the other end abutting the fixed cowl and the knuckle portion abutting the outer surface of a respective flap, moving means attached to the other end of each knuckle mechanism for moving it in a direction generally parallel with the longitudinal axis of the nozzle so as to straighten the knuckle mechanism and so allow gas loads which are exerted on the inner surfaces of the flaps to pivot the flaps outwards to increase the throat area.

Each flap may have a secondary flap hinged to its downstream end, each secondary flap having one end of a first link pivotally connected to its outer surface, the other end of the first link being connect to a further link which is mounted for arcuate movement about an axis on the fixed cowl and each knuckle mechanism includes an abutment which when the knuckle mechanism is folded, engages the other end of the first link to prevent the arcuate movement and when the knuckle mechanism straightens, moves to allow the arcuate movement and thus pivotal movement of each secondary flap.

Preferably the fixed cowl provides a movement limiting stop by directly or indirectly engaging at least the primary flaps when the primary flaps reach their final desired position.

Means may be provided to adjust the position of the secondary flaps in a direction radially inwards of the engine immediately prior to the primary flaps reaching their final desired positions.

The secondary flap adjusting means may comprise a further abutment on each knuckle mechanism, positioned and adapted so as to move into contact with the first and further links at their juncture immediately before the primary flaps reach their final position, so that during the last portion of the movement of the primary flaps, the further abutment applies a force along the first link which causes the secondary flaps to pivot radially inwardly of the engine.

The invention will now be described, by way of example and with reference to the accompanying drawings in which.

Figure 5:
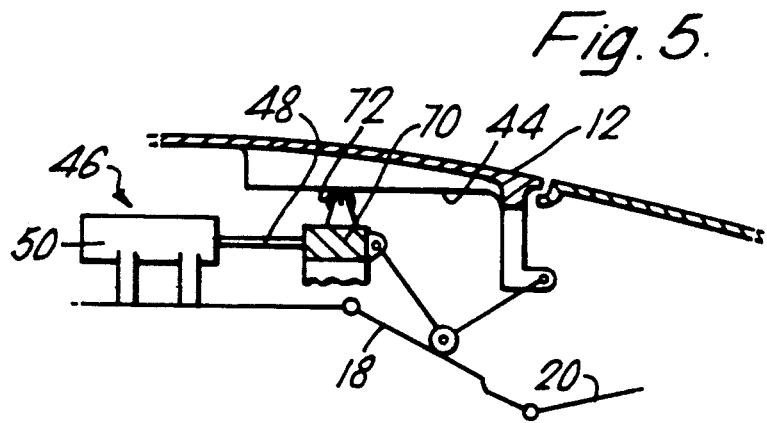

FIG. 5 diagrammatically illustrates an arrangement of the present invention in which a minimum of three ram mechanisms may be used regardless of the number of primary flaps.

Figure 1:
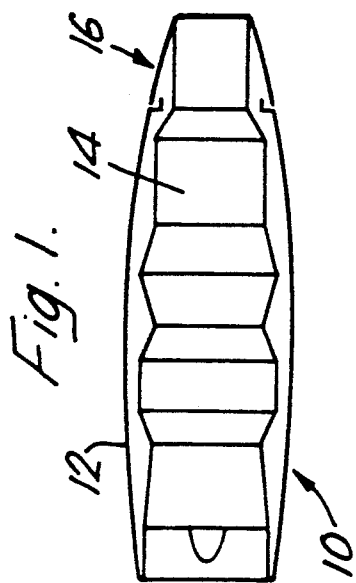
FIG. 1 is a diagrammatic view of a gas turbine engine according to the invention.

Referring to FIG. 1. A gas turbine engine 10 is enclosed in a fixed cowl 12 and has a jet pipe 14 which terminates in a variable area exhaust nozzle 16.

Figure 2:
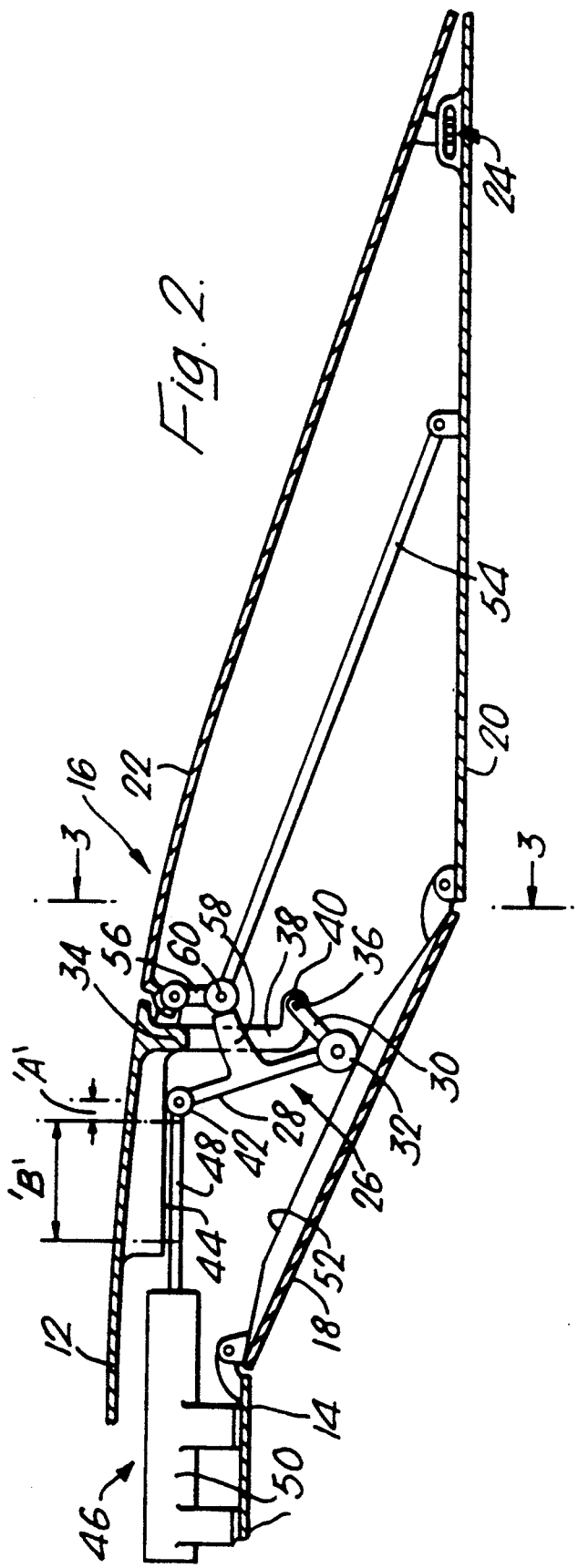
FIG. 2 is an enlarged cross sectional part view of the engine of FIG. 1

Referring now to FIG. 2. Exhaust nozzle 16 is constructed from a number of primary flaps 18 which are arranged peripherally of jet pipe 14 and hinged by their upstream ends to its downstream end. A corresponding number of secondary flaps 20 are hinged at their upstream ends, to the downstream ends of respective flaps 18.

Fixed cowl 12 terminates in a movable end which is also arranged in the form of a peripheral array of flaps 22, which are hinged to the downstream end of fixed cowl 12 and connected via a pin and slot arrangement 24, to the downstream end of secondary flaps 20.

The function of the primary flaps 18, is to define a specific throat area, having regard to the performance required, for a given mass flow of gases through the engine. In the present context, the flight regime of a vehicle (a missile) will be required to change. The throat area of nozzle 16 will therefore need to change.

Primary flaps 18 are held in a first position which provides the smallest required throat area. Primary flaps 18 are held thus by a knuckle mechanism 26, which is described thereafter.

A link 28 and a link 30 are articulately joined at their ends. A roller 32 is included at the join.

An annular flange 34 projects radially inwards from fixed cowl 12 and has a spigot 36 formed on it. Slots 38 are cut into annular flange 34, one slot being cut for each primary flap 18 and being aligned with a respective flap.

The free end of each link 30 is pivotally connected to an axle 40 (more clearly seen in FIG. 3) which is held across the mouth of a respective slot 38.

The free end of each link 28 has a further roller 42 mounted thereon, which engages a track 44 on fixed cowl 12. Track 44 lies parallel with the axis of exhaust nozzle 16.

A ram mechanism 46 is mounted on jet pipe 14 and its rod 48 is connected to the free end of link 28. The cylinder 50 of ram mechanism 46 is provided with engine fuel (though other fluids may be used) at a pressure which ensures that the piston (not shown) in cylinder 50 is maintained at the right hand end of the cylinder 50, as viewed in the drawing. Thus, in spite of exhaust gas loads endevouring to pivot primary flaps 18 outwardly. The force in the ram mechanism 46 is applied via link 28 and, by virtue of its connection with fixed structure, link 30, onto track 52 on the outer surface of primary flap 18, and holds flap 18 in the position shown in FIG. 2.

The function of secondary flaps 20 is to control the rate of expansion of exhaust gases, once they have passed through the nozzle throat i.e. the aperture defined by the downstream ends of primary flaps 18. Secondary flaps 20 also have to be held in given attitudes with respect to primary flaps 18 and, to this end a link 54 connects each secondary flap 20, to one end of a further link 56, which is mounted to fixed cowl 12 by its other end for arcuate movement in a plane containing the axis of exhaust nozzle 16.

Each link 28 of knuckle mechanisms 26 has an abutment 58 which when link 28 is in the position described hereinbefore, protrudes through slot 38 so that its end abuts the end of link 54. Gas loads on the undersides of secondary flaps 20 are thus countered by the fuel pressure in ram mechanisms 46 acting to keep link 28 and therefore abutment 58 in their positions as shown in FIG. 2.

On launch of a missile powered by the engine 10 of the present invention, the configuration of nozzle 16 will be as shown in FIG. 2 i.e. maximum throat constriction via primary flaps 18 and no gas expansion thereafter by virtue of secondary flaps 20 being substantially parallel with the axis of the nozzle 16. The engine compressor will sense a back pressure which ram air entering the intake will not be able to overcome.

After a preset time, a timing device (not shown) will enable a small quantity of fuel to be released from ram cylinder 50. Ram rod 48 will move to the left as viewed in FIG. 2, a distance 'A'. Knuckle mechanisms 26 will open and abutments 58 will pivot away from the junction of links 54 and 56. Secondary flaps 20 will then be pivoted away from the axis of nozzle 16.

Figure 3:
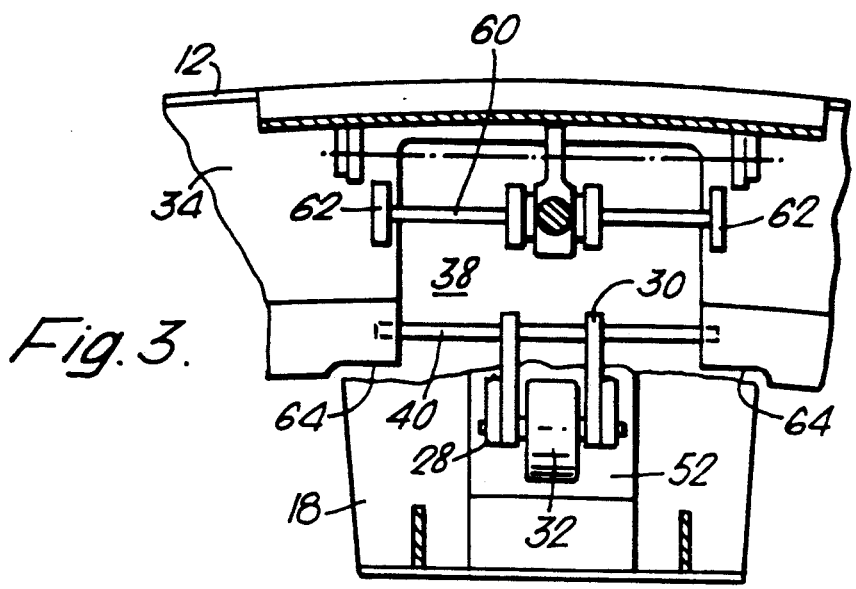
FIG. 3 is a view on line 3—3 of FIG. 2.

Referring to FIG. 3. An axle 60 provides the connection between links 54 and 56. Axle 60 spans slot 38 and carries an abutment 62 at each end. When abutment 58 pivots away as described hereinbefore, abutments 62 engage the downstream face of flange 34. Secondary flaps 20 are thus prevented from pivoting to far under the effect of gas loads.

Referring back to FIG. 2. When a nozzle configuration is required which enables the engine to boost the missile speed, cylinder 46 is emptied of fuel, thus allowing gas pressure to pivot primary flaps 18 to their fully open position end, in so doing, move ram rod 48 distance 'B'. The movement straightens knuckle mechanism 26 as abutment 52 moves along track 44.

On reaching the desired position which provides maximum throat area, primary flaps 18 abut recessed walls 64 in flange 38 (FIG. 2). A positive stop is thus ensured and the gas loads are still absorbed by the fixed cowl 12.

On pivoting of primary flaps 18 to the maximum throat area position, secondary flaps 20 maintain their altitude with respect to primary flaps 18 and thus pivot about axle 60. Movable cowl portion 22 also pivots about its connection with fixed cowl 12 and its downstream end slides axially, relative to secondary flaps 20, by virtue of their pin and slot connection 24.

Figure 4:
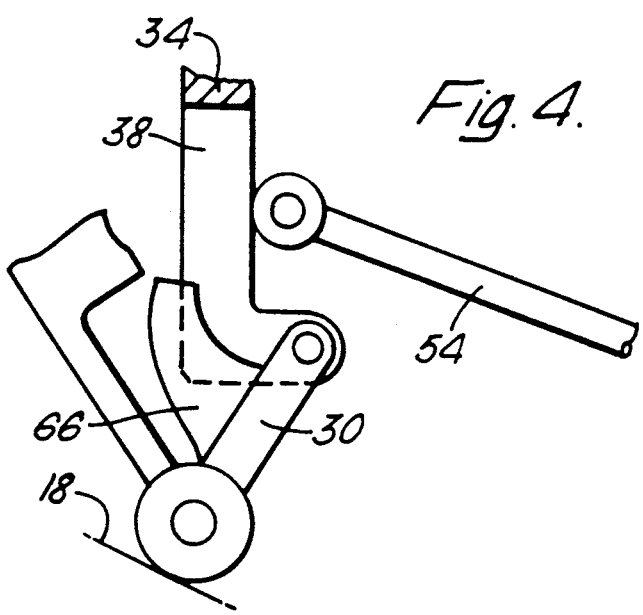
FIG. 4 is an enlarged part view of a further embodiment of the invention.

Referring now to FIG. 4. Should it prove necessary to adjust the final position of secondary flaps 20, in a direction radially inwards towards the axis of nozzle 16, a further abutment 66 of appropriate proportions may be provided on each link 30. When links 28 and 30 straighten, link 30 will swing abutment 66 through slot 38 in flange 34 and into engagement with the upstream end of link 54. During the last portion of straightening movement of links 28 and 30 therefore, a load is exerted via abutment 66 and link 54, onto respective secondary flaps 20 (not shown in FIG. 4) to pivot them radially inwards.

As described hereinbefore, the invention will require one ram mechanism 46 per primary flap 18 and associated secondary flap 20. FIG. 5 depicts an arrangement in which a minimum of three ram mechanisms 46 may be used, regardless of the number of primary flaps 18.

Three ram mechanisms 46 are equi-angularly spaced around jet pipe 14. The ram rod 48 of each ram mechanism 46 is connected to the upstream face of a ring 70 which completely encircles primary flaps 18. The upstream end of each knuckle mechanism 26 is connected to the downstream face of ring 70.

Ring 70 carries a number of rollers 72 which are in engagement with respective tracks 44 for the transmitting of gas loads to fixed cowl 12, and for case of axial movement of ring 70.

Simultaneous bleeding of the ram cylinders 50 enables transition of ring 70 to the left as viewed in FIG. 5. This in turn causes all of the knuckle mechanisms 26 to straighten as described hereinbefore, with consequent re-positioning of primary flaps 18 and associated secondary flaps 20.

Whilst the invention has been described in connection with a gas turbine engine which is suitable for powering a missile, the addition of means with which to re-charge ram cylinders with fuel (or other pressure means) would convert the invention to one which would be suitable for use on a gas turbine engine with which to power a conventional aeroplane. Moreover, knuckle mechanisms may be used with equal efficacy, on a variable area nozzle which does not include secondary flaps. In such a case, link 54, and abutments 58 and 60 would be redundant.

I claim:

1. A gas turbine engine comprising a variable area nozzle including an array of flaps which cooperate to form a throat, a fixed cowl surrounding the array of flaps, knuckle mechanisms each of which has one end pivotally connected to the fixed cowl and the other end arranged with respect to the fixed cowl so as to transmit gas loads thereto and the knuckle portion abutting the outer surface of a respective flap, moving means attached to said other end of knuckle mechanism for moving it in a direction generally parallel with the longitudinal axis of the nozzle so as to straighten said knuckle mechanism and so allow gas loads which are exerted on the inner surfaces of the flaps to pivot said flaps outwards to increase the throat area.

2. A gas turbine engine as claimed in claim 1 wherein each said converging flap has a secondary flap hinged to its downstream end, each secondary flap having one end of a first link pivotally connected to its outer surface, the other end of said first link being connected to a further link which is mounted for arcuate movement about an axis on the fixed cowl and each knuckle mechanism includes an abutment which when the knuckle mechanism is folded, engages said other end of said first link to prevent the arcuate movement and when the knuckle mechanism straightens moves to allow the arcuate movement and thus pivoted movement of the secondary flap by gas loads acting on the secondary flap inner surface.

3. A gas turbine engine as claimed in claim 1 wherein the fixed cowl provides a movement limiting stop whereby the throat forming flaps are prevented from pivoting radially outwardly beyond a desired position.

4. A gas turbine engine as claimed in claim 3 wherein each knuckle mechanism includes a further abutment which when the knuckle mechanism is straightened, engages said other end of said link and via said link, exerts a force on said secondary flap to pivot it radially inwardly towards the longitudinal axis of the nozzle.

5. A gas turbine engine as claimed in claim 4 wherein the moving means comprises ram mechanisms each connected by a ram rod to the other end of a respective knuckle mechanism and said other end of the knuckle mechanism engages said fixed cowl for the transmission of gas load and relative movement axially of the nozzle.

6. A gas turbine engine as claimed in claim 5 wherein the moving means comprises at least three ram mechanisms fixed to fixed structure and equi-angularly spaced about the longitudinal axis of the nozzle, and a ring surrounding the nozzle, wherein the ram rods of the ram mechanisms are connected to the upstream face of said ring and said other ends of said knuckle mechanisms are connected to the downstream face of said ring and wherein the ring engages the fixed cowl for the transmission of gas loads and for movement relative thereto, axially of the nozzle.

7. A gas turbine engine as claimed in claim 6 wherein said ring engages said fixed cowl via rollers which are mounted on said ring in equi angularly spaced array.

8. A gas turbine engine as claimed in claim 2 wherein the fixed cowl provides a movement limiting stop whereby the throat forming flaps are prevented from pivoting radially outwardly beyond a desired position.

* * * * *